(12) United States Patent
Xiang et al.

(10) Patent No.: US 11,860,736 B2
(45) Date of Patent: Jan. 2, 2024

(54) RESUMABLE COPY-ON-WRITE (COW) B+TREE PAGES DELETION

(71) Applicant: VMware, Inc., Palo Alto, CA (US)

(72) Inventors: Enning Xiang, San Jose, CA (US); Pranay Singh, San Ramon, CA (US); Junlong Gao, Santa Clara, CA (US); Hardik Singh Negi, Sunnyvale, CA (US); Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 39 days.

(21) Appl. No.: 17/644,618

(22) Filed: Dec. 16, 2021

(65) Prior Publication Data

US 2023/0195576 A1 Jun. 22, 2023

(51) Int. Cl.
*G06F 11/00* (2006.01)
*G06F 11/14* (2006.01)
*G06F 16/22* (2019.01)
*G06F 16/11* (2019.01)

(52) U.S. Cl.
CPC ...... *G06F 11/1407* (2013.01); *G06F 11/1474* (2013.01); *G06F 16/128* (2019.01); *G06F 16/2246* (2019.01)

(58) Field of Classification Search
CPC ............. G06F 11/1407; G06F 11/1474; G06F 11/1448; G06F 11/1446; G06F 11/1471; G06F 11/1451; G06F 11/1453; G06F 16/2246; G06F 16/128
See application file for complete search history.

(56) References Cited

U.S. PATENT DOCUMENTS

| | | | |
|---|---|---|---|
| 10,725,967 B1 * | 7/2020 | Natanzon | G06F 16/128 |
| 11,567,872 B1 | 1/2023 | Pillai | |
| 2012/0011106 A1 * | 1/2012 | Reid | G06F 11/1471 707/703 |
| 2016/0313943 A1 | 10/2016 | Hashimoto | |
| 2016/0371190 A1 | 12/2016 | Romanovskiy | |
| 2017/0032005 A1 * | 2/2017 | Zheng | G06F 16/128 |
| 2020/0019620 A1 * | 1/2020 | Sarda | G06F 3/0608 |
| 2020/0175074 A1 * | 6/2020 | Li | G06F 12/0871 |
| 2021/0294499 A1 | 9/2021 | Wang | |
| 2021/0349850 A1 * | 11/2021 | Carey | G06F 16/2246 |

* cited by examiner

*Primary Examiner* — Joseph D Manoskey
(74) *Attorney, Agent, or Firm* — Dinsmore & Shohl LLP (57) ABSTRACT

A method for resumeable snapshot deletion is provided. A method for deletion of nodes maintained in an ordered data structure for a first snapshot includes processing the nodes maintained in the ordered data structure according to a defined order, setting a node path cursor with a pointer to a node and an indication of the deletion of the node; storing the node path cursor in a persistent storage; and during processing of the nodes: detecting a failure; after the failure, checking the pointer of the node path cursor; and resuming processing of the nodes starting from the first node indicated by the pointer.

20 Claims, 6 Drawing Sheets

RESUMABLE COPY-ON-WRITE (COW) B+TREE PAGES DELETION

BACKGROUND

In the field of data storage, a storage area network (SAN) is a dedicated, independent high-speed network that interconnects and delivers shared pools of storage devices to multiple servers. A virtual SAN (VSAN) may aggregate local or direct-attached data storage devices, to create a single storage pool shared across all hosts in a host cluster. This pool of storage (sometimes referred to herein as a "datastore" or "data storage") may allow virtual machines (VMs) running on hosts in the host cluster to store virtual disks that are accessed by the VMs during their operations. The VSAN architecture may be a two-tier datastore including a performance tier for the purpose of read caching and write buffering and a capacity tier for persistent storage.

The VSAN datastore may manage storage of virtual disks at a block granularity. For example, VSAN may be divided into a number of physical blocks (e.g., 4096 bytes or "4K" size blocks), each physical block having a corresponding physical block address (PBA) that indexes the physical block in storage. Physical blocks of the VSAN may be used to store blocks of data (also referred to as data blocks) used by VMs, which may be referenced by logical block addresses (LBAs). Each block of data may have an uncompressed size corresponding to a physical block. Blocks of data may be stored as compressed data or uncompressed data in the VSAN, such that there may or may not be a one to one correspondence between a physical block in VSAN and a data block referenced by an LBA.

Modern storage platforms, including the VSAN datastore, may enable snapshot features for backup, archival, or data protections purposes. Snapshots provide the ability to capture a point-in-time state and data of a VM to not only allow data to be recovered in the event of failure but restored to known working points. Snapshots may not be stored as physical copies of all data blocks, but rather may entirely, or in part, be stored as pointers to the data blocks that existed when the snapshot was created.

Each snapshot may include its own snapshot metadata, e.g., mapping of LBAs mapped to PBAs, stored concurrently by several compute nodes (e.g., metadata servers). The snapshot metadata may be stored as key-value data structures to allow for scalable input/output (I/O) operations. In particular, a unified logical map B+ tree may be used to manage logical extents for the logical address to physical address mapping of each snapshot, where an extent is a specific number of contiguous data blocks allocated for storing information. A B+ tree is a multi-level data structure having a plurality of nodes, each node containing one or more key-value pairs stored as tuples (e.g., <key, value>). A key is an identifier of data and a value is either the data itself or a pointer to a location (e.g., in memory or on disk) of the data associated with the identifier.

In certain embodiments, the logical map B+ tree may be a copy-on-write (COW) B+ tree (also referred to as an append-only B+ tree). COW techniques improve performance and provide time and space efficient snapshot creation by only copying metadata about where the original data is stored, as opposed to creating a physical copy of the data, when a snapshot is created. Accordingly, when a COW approach is taken and a new child snapshot is to be created, instead of copying the entire logical map B+ tree of the parent snapshot, the child snapshot shares with the parent and, in some cases, ancestor snapshots, one or more extents by having a B+ tree index node, exclusively owned by the child, point to shared parent and/or ancestor B+ tree nodes. Updates to the logical map COW B+ tree can be recorded in a write-ahead-log (WAL). The changes to the logical map COW B+ tree may be kept in memory until they are persisted to storage. Once a COW B+ tree operation is persisted to storage, the corresponding record may be removed from the WAL.

When a snapshot is deleted, the corresponding logical map B+ tree nodes are also deleted. A snapshots may be deleted manually by an administrator or automatically. To delete the logical map B+ tree nodes, the logical map B+ tree may be traversed to delete the nodes that are exclusively owned by the snapshot. The logical map B+ tree nodes are deleted transactionally. Each transaction can have a resource limitation. Accordingly, the logical map B+ tree nodes may not be processed in a single large transaction due to the resource limitation.

When a crash or other failure occurs during snapshot deletion, the logical map B+ tree needs to be restored to the correct state and the node deletion properly resumed. Nodes in the logical map B+ tree may store pointers to one or more child nodes. The pointers may be stored as index values, where each index value is associated with a child node of that node. When a crash or failure occurs, one or more pointers in the logical map B+ tree may become dangling when the child node has been deleted or overwritten, but the pointer in the logical map B+ tree has not been removed. For example, in a top-down logical map B+ tree deletion, an index node is not deleted until all of the child nodes of the index node have been processed. Thus, a child node may be deleted before the index node pointing to that child is deleted, creating a dangling pointer in the index node. Such dangling pointers can lead to data corruption. For example, if the logical map B+ tree deletion is simply restarted, unrelated data pointed to by the dangling pointers may be removed.

Accordingly, there is a need in the art for improved techniques to delete logical map B+ tree nodes and for resuming snapshot deletion.

It should be noted that the information included in the Background section herein is simply meant to provide a reference for the discussion of certain embodiments in the Detailed Description. None of the information included in this Background should be considered as an admission of prior art.

DETAILED DESCRIPTION

Aspects of the present disclosure introduce techniques for resumable logical map B+ tree node deletion.

A snapshot hierarchy may include a plurality of snapshots connected in a branch tree structure. Each snapshot contained in the snapshot hierarchy may have a parent-child relationship with one or more snapshots in the snapshot hierarchy. A parent snapshot may be a snapshot created during a first backup session, while a child snapshot may be a snapshot created from the parent snapshot in a subsequent backup session, and accordingly, be linked to the parent snapshot. The child snapshot may be created to capture the differences from the parent snapshot when data is modified. The child snapshot then becomes a parent snapshot during an additional backup session where another child snapshot is created, thereby creating the hierarchy of snapshots.

Metadata for each of the snapshots in the snapshot hierarchy may be maintained in several compute nodes of a copy-on-write (COW) B+ tree mapping architecture. As mentioned, COW techniques may be used to build up metadata mapping tables for each snapshot in the snapshot hierarchy. When a COW approach is taken and a new child snapshot, logical map is to be created, instead of copying the entire B+ tree of the parent snapshot, the logical map created for the child snapshot shares metadata of the logical map B+ tree created for the parent snapshot. Accordingly, one or more nodes of the B+ tree belonging to the parent snapshot may be shared with a child snapshot. Overall, the COW B+ tree may be a single COW B+ tree built up for logical maps of each of the snapshots. Each snapshot may have one root node in the COW B+ tree for its logical map.

When a snapshot is deleted, nodes exclusively owned by the snapshot are removed from the logical map B+ tree. To verify a node is exclusively owned by the snapshot, the system verifies that the node is not shared with a parent or child snapshot. The system can efficiently verify that the node is not shared with a parent snapshot when a sequence number (SN) associated with the node is equal to or larger than a minimum SN assigned to the snapshot. Alternatively, the system may verify the node is not shared with the parent by traversing the logical map B+ tree to confirm that a logical block address (LBA) associated with the node is not found in a parent snapshot. Similarly, to verify the node is not shared with a child snapshot, the system can traverse the logical map B+ tree to confirm that the LBA associated with the node is not found in a child snapshot.

In deleting a snapshot, the system may traverse the logical map B+ tree in a top-down manner to delete the nodes exclusively owned by the snapshot and skip nodes that are not exclusively owned by the snapshot. With a top-down traversal, the system may first process a root node associated with the snapshot. The system proceeds to process an index node and the leaf nodes pointed to by the index node, before moving to a next index node, and so on. An exclusively owned leaf node may be deleted when the leaf node is processed. An exclusively owned index node may be deleted when all of its exclusively owned leaf nodes have been deleted. A root node may be deleted when all of its exclusively owned index nodes have been deleted.

One approach for resuming logical map B+ tree deletion is to persistently store identifier information (e.g., a physical address) of processed nodes during logical map B+ tree deletion. In crash recovery, the logical map B+ tree deletion is restarted and the system skips nodes identified in the persisted list of proceed nodes. This may avoid accessing of dangling pointers, however, this approach has high overhead in persisting identifier information of every processed node. The system also needs to filter out invalid child nodes for each node in the lookup path when restarting the logical map B+ tree deletion, which may be inefficient.

According to aspects of the present disclosure, a node path cursor is updated and persisted as the system traverses the logical map B+ tree. The node path cursor stores information about a latest processed node, instead of all processed nodes. The node path cursor may be an array of the physical address (e.g., PBA) of a parent node and a pointer index of the child node being processed. The node path cursor may be stored as tuples of <parent node physical address, child node index>. When a node is deleted, the node path cursor may be set to the physical address of the deleted node and a value indicating the deletion. The value may be a value different than a child node index, such as −1. Thus, when a node is deleted, the node path cursor may be stored as the tuple <node physical address, −1>. In some embodiments, the node path cursor may contain an array of tuples including a tuple for each traversed layer of the logical map B+ tree. For example, after deleting a leaf node the node path cursor may be set to <PBA of root node, pointer to index node>, <PBA of index node, pointer to leaf node>, <PBA of leaf node, −1>. In some embodiments, the node path cursor includes the physical address of the root node and a pointer to a child node per logical map B+ tree layer. For example, after deleting the leaf node the node path cursor may be set to <PBA of root node, pointer to index node>, <pointer to leaf node>, <−1>.

The node path cursor may be persisted (i.e., stored to a persistent non-volatile storage) when a node is deleted. In some embodiments, the node path cursor is persisted when a transaction is committed. Committing a transaction may refer to actually executing a change to the data in persistent storage. For snapshot deletion, committing a transaction may refer to deleting a page, associated with a node, from storage. In some embodiments, the node path cursor is held in memory and lazily flushed to the persistent storage location. For example, a transaction may not be committed until a threshold number of nodes (e.g., a commit threshold) are to be deleted in a transaction. The node path cursor may be kept in memory until the commit threshold is reached and a transaction is committed. In this way, the I/O cost to update the node path cursor can be amortized over multiple transactions.

When a crash or other failure occurs, the system uses the node path cursor to resume snapshot deletion starting from the last processed node indicated by the node path cursor. Thus, accessing of dangling nodes is avoided because the system will assume the previous nodes have already been processed and will begin from the next node after the node indicated in the node path cursor. In addition, because the size of the node path cursor is small, the overhead is reduced.

Though certain aspects described herein are described with respect to snapshot B+ trees, the aspects may be applicable to any suitable ordered data structure.

Figure 1:
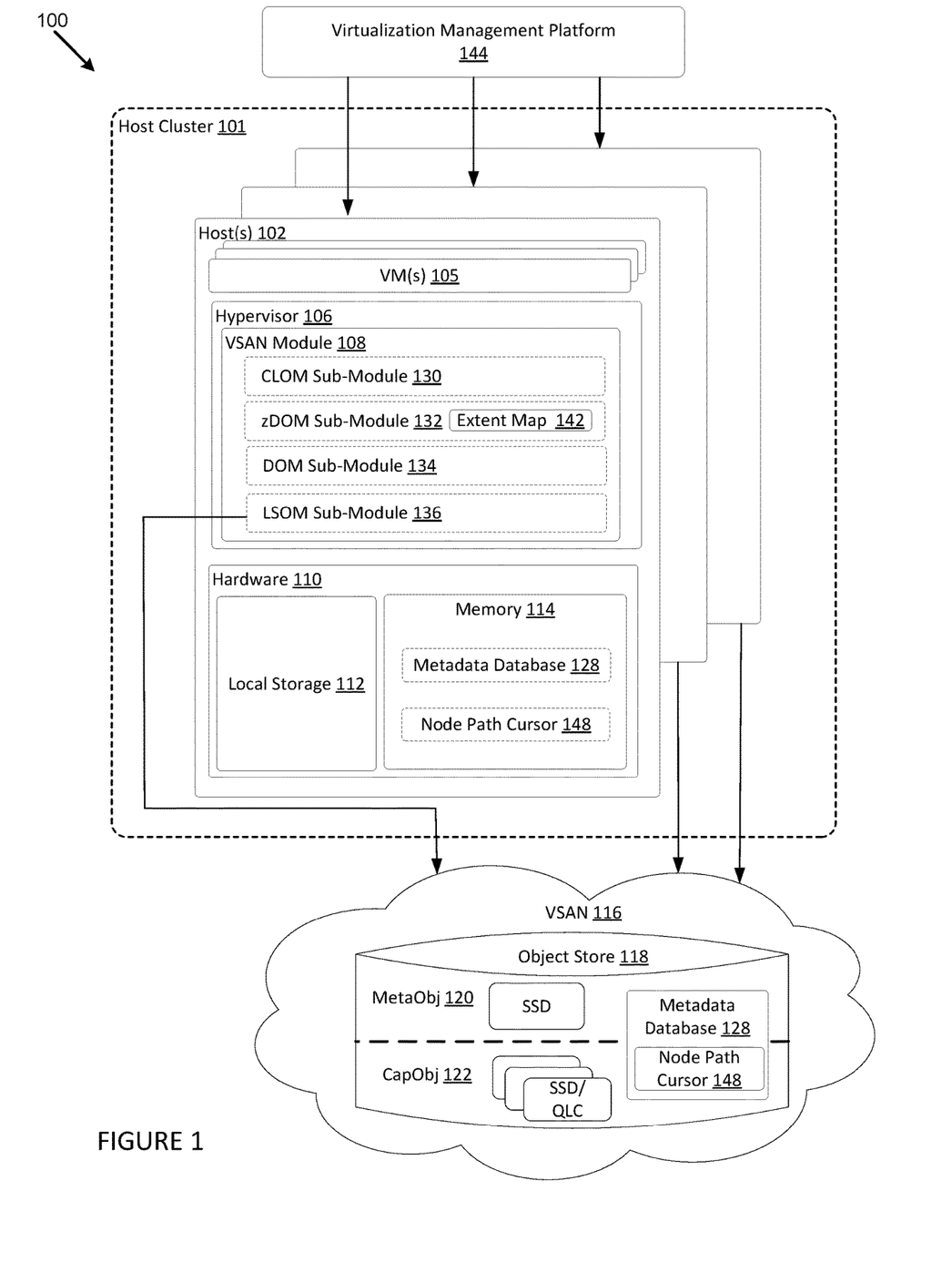
FIG. 1 is a diagram illustrating an example computing environment in which embodiments of the present application may be practiced.

FIG. 1 is a diagram illustrating an example computing environment 100 in which embodiments may be practiced. As shown, computing environment 100 may include a distributed object-based datastore, such as a software-based "virtual storage area network" (VSAN) environment, VSAN 116, that leverages the commodity local storage housed in or directly attached (hereinafter, use of the term "housed" or "housed in" may be used to encompass both housed in or otherwise directly attached) to host(s) 102 of a host cluster 101 to provide an aggregate object storage to virtual machines (VMs) 105 running on the host(s) 102. The local commodity storage housed in the hosts 102 may include combinations of solid state drives (SSDs) or non-volatile memory express (NVMe) drives, magnetic or spinning disks or slower/cheaper SSDs, or other types of storages.

Additional details of VSAN are described in U.S. Pat. No. 10,509,708, the entire contents of which are incorporated by reference herein for all purposes, and U.S. patent application Ser. No. 17/181,476, the entire contents of which are incorporated by reference herein for all purposes.

As described herein, VSAN 116 is configured to store virtual disks of VMs 105 as data blocks in a number of physical blocks, each physical block having a PBA that indexes the physical block in storage. VSAN module 108 may create an "object" for a specified data block by backing it with physical storage resources of an object store 118 (e.g., based on a defined policy).

VSAN 116 may be a two-tier datastore, storing the data blocks in both a smaller, but faster, performance tier and a larger, but slower, capacity tier. The data in the performance tier may be stored in a first object (e.g., a data log that may also be referred to as a MetaObj 120) and when the size of data reaches a threshold, the data may be written to the capacity tier (e.g., in full stripes, as described herein) in a second object (e.g., CapObj 122) in the capacity tier. SSDs may serve as a read cache and/or write buffer in the performance tier in front of slower/cheaper SSDs (or magnetic disks) in the capacity tier to enhance I/O performance. In some embodiments, both performance and capacity tiers may leverage the same type of storage (e.g., SSDs) for storing the data and performing the read/write operations. Additionally, SSDs may include different types of SSDs that may be used in different tiers in some embodiments. For example, the data in the performance tier may be written on a single-level cell (SLC) type of SSD, while the capacity tier may use a quad-level cell (QLC) type of SSD for storing the data.

Each host 102 may include a storage management module (referred to herein as a VSAN module 108) in order to automate storage management workflows (e.g., create objects in MetaObj 120 and CapObj 122 of VSAN 116, etc.) and provide access to objects (e.g., handle I/O operations to objects in MetaObj 120 and CapObj 122 of VSAN 116, etc.) based on predefined storage policies specified for objects in object store 118.

A virtualization management platform 144 is associated with host cluster 101. Virtualization management platform 144 enables an administrator to manage the configuration and spawning of VMs 105 on various hosts 102. As illustrated in FIG. 1, each host 102 includes a virtualization layer or hypervisor 106, a VSAN module 108, and hardware 110 (which includes the storage (e.g., SSDs) of a host 102). Through hypervisor 106, a host 102 is able to launch and run multiple VMs 105. Hypervisor 106, in part, manages hardware 110 to properly allocate computing resources (e.g., processing power, random access memory (RAM), etc.) for each VM 105. Each hypervisor 106, through its corresponding VSAN module 108, provides access to storage resources located in hardware 110 (e.g., storage) for use as storage for virtual disks (or portions thereof) and other related files that may be accessed by any VM 105 residing in any of hosts 102 in host cluster 101.

VSAN module 108 may be implemented as a "VSAN" device driver within hypervisor 106. In such an embodiment, VSAN module 108 may provide access to a conceptual "VSAN" through which an administrator can create a number of top-level "device" or namespace objects that are backed by object store 118 of VSAN 116. By accessing application programming interfaces (APIs) exposed by VSAN module 108, hypervisor 106 may determine all the top-level file system objects (or other types of top-level device objects) currently residing in VSAN 116.

Each VSAN module 108 (through a cluster level object management or "CLOM" sub-module 130) may communicate with other VSAN modules 108 of other hosts 102 to create and maintain an in-memory metadata database 128 (e.g., maintained separately but in synchronized fashion in memory 114 of each host 102) that may contain metadata describing the locations, configurations, policies and relationships among the various objects stored in VSAN 116. Specifically, in-memory metadata database 128 may serve as a directory service that maintains a physical inventory of VSAN 116 environment, such as the various hosts 102, the storage resources in hosts 102 (e.g., SSD, NVMe drives, magnetic disks, etc.) housed therein, and the characteristics/capabilities thereof, the current state of hosts 102 and their corresponding storage resources, network paths among hosts 102, and the like. In-memory metadata database 128 may further provide a catalog of metadata for objects stored in MetaObj 120 and CapObj 122 of VSAN 116 (e.g., what virtual disk objects exist, what component objects belong to what virtual disk objects, which hosts 102 serve as "coordinators" or "owners" that control access to which objects, quality of service requirements for each object, object configurations, the mapping of objects to physical storage locations, etc.).

In-memory metadata database 128 is used by VSAN module 108 on host 102, for example, when a user (e.g., an administrator) first creates a virtual disk for VM 105 as well as when VM 105 is running and performing I/O operations (e.g., read or write) on the virtual disk.

VSAN module 108, by querying its local copy of in-memory metadata database 128, may be able to identify a particular file system object (e.g., a virtual machine file system (VMFS) file system object) stored in object store 118 that may store a descriptor file for the virtual disk. The descriptor file may include a reference to a virtual disk object that is separately stored in object store 118 of VSAN 116 and conceptually represents the virtual disk (also referred to herein as composite object). The virtual disk object may store metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by a user (e.g., an administrator) when creating the virtual disk.

The metadata accessible by VSAN module 108 in in-memory metadata database 128 for each virtual disk object provides a mapping to or otherwise identifies a particular host 102 in host cluster 101 that houses the physical storage resources (e.g., slower/cheaper SSDs, magnetics disks, etc.) that actually stores the physical disk of host 102.

In some embodiments, VSAN module 108 is configured to delete a snapshot logical map B+ tree from metadata database 128. VSAN module 108 may store a node path cursor 148 in metadata database 128. Node path cursor 148 includes information about a last processed node in the logical map B+ tree. In some embodiments, node path cursor 148 is an array of the physical address (e.g., PBA) of a parent node and a pointer to a child node for each traversed level of the logical map B+ tree to the child node being processed. Node path cursor 148 may be stored as the tuple <PBA of parent node, child node index> for each level. In some embodiments, node path cursor 148 is an array of the physical address of the root node and a pointer to a child node at each traversed level of the logical map B+ tree to the child node being processed. When a node is deleted, node path cursor 148 may be set to the physical address of the deleted node and a value indicating the deletion. The value may be a value different than a child node index, such as a value of −1, where a child node index may be 0 or 1. Thus, when a node is deleted, node path cursor 148 may be stored as the tuple <physical address of deleted node, −1>. In some embodiments, VSAN module 108 stores node path cursor 148 in memory 114 and lazily flushes node path cursor to metadata database 128 in VSAN 116. When a crash or other failure occurs, VSAN module 108 may access node path cursor 148 to resume snapshot deletion from the last processed node in the logical map B+ tree, indicated by node path cursor 148.

Various sub-modules of VSAN module 108, including, in some embodiments, CLOM sub-module 130, distributed object manager (DOM) sub-module 134, zDOM sub-module 132, and/or local storage object manager (LSOM) sub-module 136, handle different responsibilities. CLOM sub-module 130 generates virtual disk blueprints during creation of a virtual disk by a user (e.g., an administrator) and ensures that objects created for such virtual disk blueprints are configured to meet storage profile or policy requirements set by the user. In addition to being accessed during object creation (e.g., for virtual disks), CLOM sub-module 130 may also be accessed (e.g., to dynamically revise or otherwise update a virtual disk blueprint or the mappings of the virtual disk blueprint to actual physical storage in object store 118) on a change made by a user to the storage profile or policy relating to an object or when changes to the cluster or workload result in an object being out of compliance with a current storage profile or policy.

In one embodiment, if a user creates a storage profile or policy for a virtual disk object, CLOM sub-module 130 applies a variety of heuristics and/or distributed algorithms to generate a virtual disk blueprint that describes a configuration in host cluster 101 that meets or otherwise suits a storage policy. The storage policy may define attributes such as a failure tolerance, which defines the number of host and device failures that a VM can tolerate. A redundant array of inexpensive disks (RAID) configuration may be defined to achieve desired redundancy through mirroring and access performance through erasure coding (EC). EC is a method of data protection in which each copy of a virtual disk object is partitioned into stripes, expanded and encoded with redundant data pieces, and stored across different hosts 102 of VSAN 116 datastore. For example, a virtual disk blueprint may describe a RAID 1 configuration with two mirrored copies of the virtual disk (e.g., mirrors) where each are further striped in a RAID 0 configuration. Each stripe may contain a plurality of data blocks (e.g., four data blocks in a first stripe). Including RAID 5 and RAID 6 configurations, each stripe may also include one or more parity blocks. Accordingly, CLOM sub-module 130, may be responsible for generating a virtual disk blueprint describing a RAID configuration.

CLOM sub-module 130 may communicate the blueprint to its corresponding DOM sub-module 134, for example, through zDOM sub-module 132. DOM sub-module 134 may interact with objects in VSAN 116 to implement the blueprint by allocating or otherwise mapping component objects of the virtual disk object to physical storage locations within various hosts 102 of host cluster 101. DOM sub-module 134 may also access in-memory metadata database 128 to determine the hosts 102 that store the component objects of a corresponding virtual disk object and the paths by which those hosts 102 are reachable in order to satisfy the I/O operation. Some or all of metadata database 128 (e.g., the mapping of the object to physical storage locations, etc.) may be stored with the virtual disk object in object store 118.

When handling an I/O operation from VM 105, due to the hierarchical nature of virtual disk objects in certain embodiments, DOM sub-module 134 may further communicate across the network (e.g., a local area network (LAN), or a wide area network (WAN)) with a different DOM sub-module 134 in a second host 102 (or hosts 102) that serves as the coordinator for the particular virtual disk object that is stored in local storage 112 of the second host 102 (or hosts 102) and which is the portion of the virtual disk that is subject to the I/O operation. If VM 105 issuing the I/O operation resides on a host 102 that is also different from the coordinator of the virtual disk object, DOM sub-module 134 of host 102 running VM 105 may also communicate across the network (e.g., LAN or WAN) with the DOM sub-module 134 of the coordinator. DOM sub-modules 134 may also similarly communicate amongst one another during object creation (and/or modification).

Each DOM sub-module 134 may create their respective objects, allocate local storage 112 to such objects, and advertise their objects in order to update in-memory metadata database 128 with metadata regarding the object. In order to perform such operations, DOM sub-module 134 may interact with a local storage object manager (LSOM) sub-module 136 that serves as the component in VSAN module 108 that may actually drive communication with the local SSDs (and, in some cases, magnetic disks) of its host 102. In addition to allocating local storage 112 for virtual disk objects (as well as storing other metadata, such as policies and configurations for composite objects for which its node serves as coordinator, etc.), LSOM sub-module 136 may additionally monitor the flow of I/O operations to local storage 112 of its host 102, for example, to report whether a storage resource is congested. [0043] zDOM sub-module 132 may be responsible for caching received data in the performance tier of VSAN 116 (e.g., as a virtual disk object in MetaObj 120) and writing the cached data as full stripes on one or more disks (e.g., as virtual disk objects in CapObj 122). To reduce I/O overhead during write operations to the capacity tier, zDOM may require a full stripe (also referred to herein as a full segment) before writing the data to the capacity tier. Data striping is the technique of segmenting logically sequential data, such as the virtual disk. Each stripe may contain a plurality of data blocks; thus, a full stripe write may refer to a write of data blocks that fill a whole stripe. A full stripe write operation may be more efficient compared to the partial stripe write, thereby increasing overall I/O performance. For example, zDOM sub-module 132 may do this full stripe writing to minimize a write amplification effect. Write amplification, refers to the phenomenon that occurs in, for example, SSDs, in which the amount of data written to the memory device is greater than the amount of information you requested to be stored by host 102. Write amplification may differ in different types of writes. Lower write amplification may increase performance and lifespan of an SSD.

In some embodiments, zDOM sub-module 132 performs other datastore procedures, such as data compression and hash calculation, which may result in substantial improvements, for example, in garbage collection, deduplication, snapshotting, etc. (some of which may be performed locally by LSOM sub-module 136 of FIG. 1).

In some embodiments, zDOM sub-module 132 stores and accesses an extent map 142. Extent map 142 provides a mapping of logical block addresses (LBAs) to physical block addresses (PBAs), or LBAs to middle block addresses (MBAs) to PBAs. Each physical block having a corresponding PBA may be referenced by one or more LBAs.

In certain embodiments, for each LBA, VSAN module 108, may store in a logical map of extent map 142, at least a corresponding PBA. The logical map may include an LBA to PBA mapping table. For example, the logical map may store tuples of <LBA, PBA>, where the LBA is the key and the PBA is the value. As used herein, a key is an identifier of data and a value is either the data itself or a pointer to a location (e.g., on disk) of the data associated with the identifier. In some embodiments, the logical map further includes a number of corresponding data blocks stored at a physical address that starts from the PBA (e.g., tuples of <LBA, PBA, number of blocks>, where LBA is the key). In some embodiments where the data blocks are compressed, the logical map further includes the size of each data block compressed in sectors and a compression size (e.g., tuples of <LBA, PBA, number of blocks, number of sectors, compression size>, where LBA is the key).

In certain other embodiments, for each LBA, VSAN module 108, may store in a logical map, at least a corresponding MBA, which further maps to a PBA in a middle map of extent map 142. In other words, extent map 142 may be a two-layer mapping architecture. A first map in the mapping architecture, e.g., the logical map, may include an LBA to MBA mapping table, while a second map, e.g., the middle map, may include an MBA to PBA mapping table. For example, the logical map may store tuples of <LBA, MBA>, where the LBA is the key and the MBA is the value, while the middle map may store tuples of <MBA, PBA>, where the MBA is the key and the PBA is the value. According to the information stored in the logical map, VSAN module 108 may use the logical map to determine which PBA is referenced by an LBA.

Logical maps may also be used in snapshot mapping architecture. Modern storage platforms, including VSAN 116, may enable snapshot features for backup, archival, or data protections purposes. Snapshots provide the ability to capture a point-in-time state and data of a VM 105 to not only allow data to be recovered in the event of failure but restored to known working points. Snapshots may capture VMs' 105 storage, memory, and other devices, such as virtual network interface cards (NICs), at a given point in time. Snapshots do not require an initial copy, as they are not stored as physical copies of data blocks (at least initially), but rather as pointers to the data blocks that existed when the snapshot was created. Because of this physical relationship, a snapshot may be maintained on the same storage array as the original data.

As mentioned, snapshots collected over two or more backup sessions may create a snapshot hierarchy where snapshots are connected in a branch tree structure with one or more branches. Snapshots in the hierarchy have parent-child relationships with one or more other snapshots in the hierarchy. In linear processes, each snapshot has one parent snapshot and one child snapshot, except for the last snapshot, which has no child snapshots. Each parent snapshot may have more than one child snapshot. Additional snapshots in the snapshot hierarchy may be created by reverting to the current parent snapshot or to any parent or child snapshot in the snapshot tree to create more snapshots from that snapshot. Each time a snapshot is created by reverting to any parent or child snapshot in the snapshot tree, a new branch in the branch tree structure is created.

Figure 2:
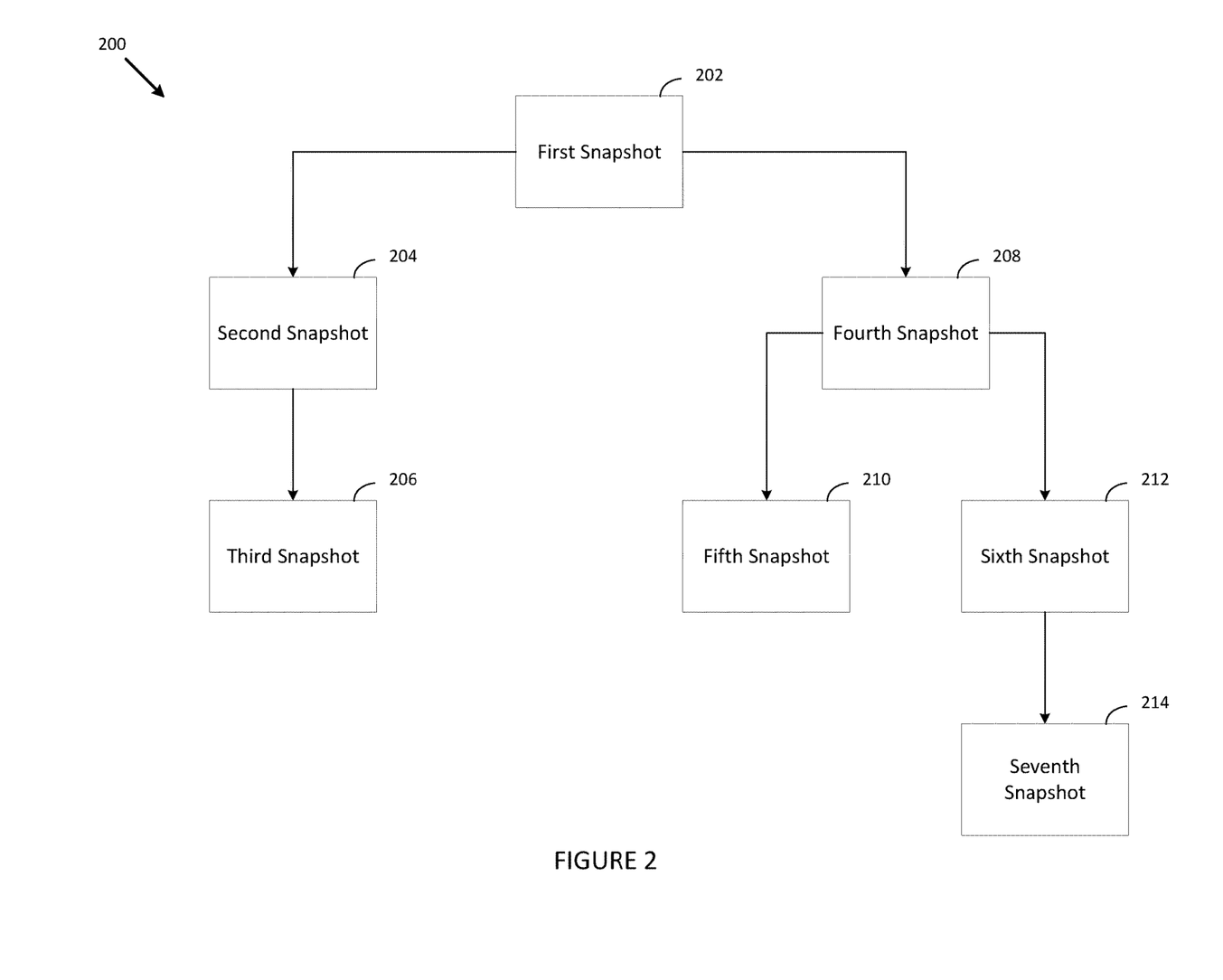
FIG. 2 is a block diagram illustrating an example snapshot hierarchy, according to an example embodiment of the present disclosure.

FIG. 2 is a block diagram illustrating an example snapshot hierarchy 200, according to an example embodiment of the present disclosure. As shown in FIG. 2, seven snapshots may exist in snapshot hierarchy 200. A first snapshot 202 may be a snapshot created first in time. First snapshot 202 may be referred to as a root snapshot of the snapshot hierarchy 200, as first snapshot 202 does not have any parent snapshots. First snapshot 202 may further have two child snapshots: second snapshot 204 and fourth snapshot 208. Fourth snapshot 208 may have been created after reverting back to first snapshot 202 in snapshot hierarchy 200, thereby creating an additional branch from first snapshot 202 to fourth snapshot 208. Second snapshot 204 and fourth snapshot 208 may be considered sibling snapshots. Second snapshot 204 and fourth snapshot 208 may not only be child snapshots of first snapshot 202 but also parent snapshots of other snapshots in snapshot hierarchy 200. In particular, second snapshot 204 may be a parent of third snapshot 206, and fourth snapshot 208 may be a parent of both fifth snapshot 210 and sixth snapshot 212. Third snapshot 206, fifth snapshot 210, and sixth snapshot 212 may be considered grandchildren snapshots of first snapshot 202. Third snapshot 206 and fifth snapshot 210 may not have any children snapshots; however, sixth snapshot 212 may have a child snapshot, seventh snapshot 214. Seventh snapshot 214 may not have any children snapshots in snapshot hierarchy 200.

While FIG. 2 illustrates only seven snapshots in snapshot hierarchy 200, any number of snapshots may be considered as part of a snapshot hierarchy. Further, any parent-child relationships between the snapshots in the snapshot hierarchy may exist in addition to, or alternative to, the parent-child relationships illustrated in FIG. 2.

Figure 3:
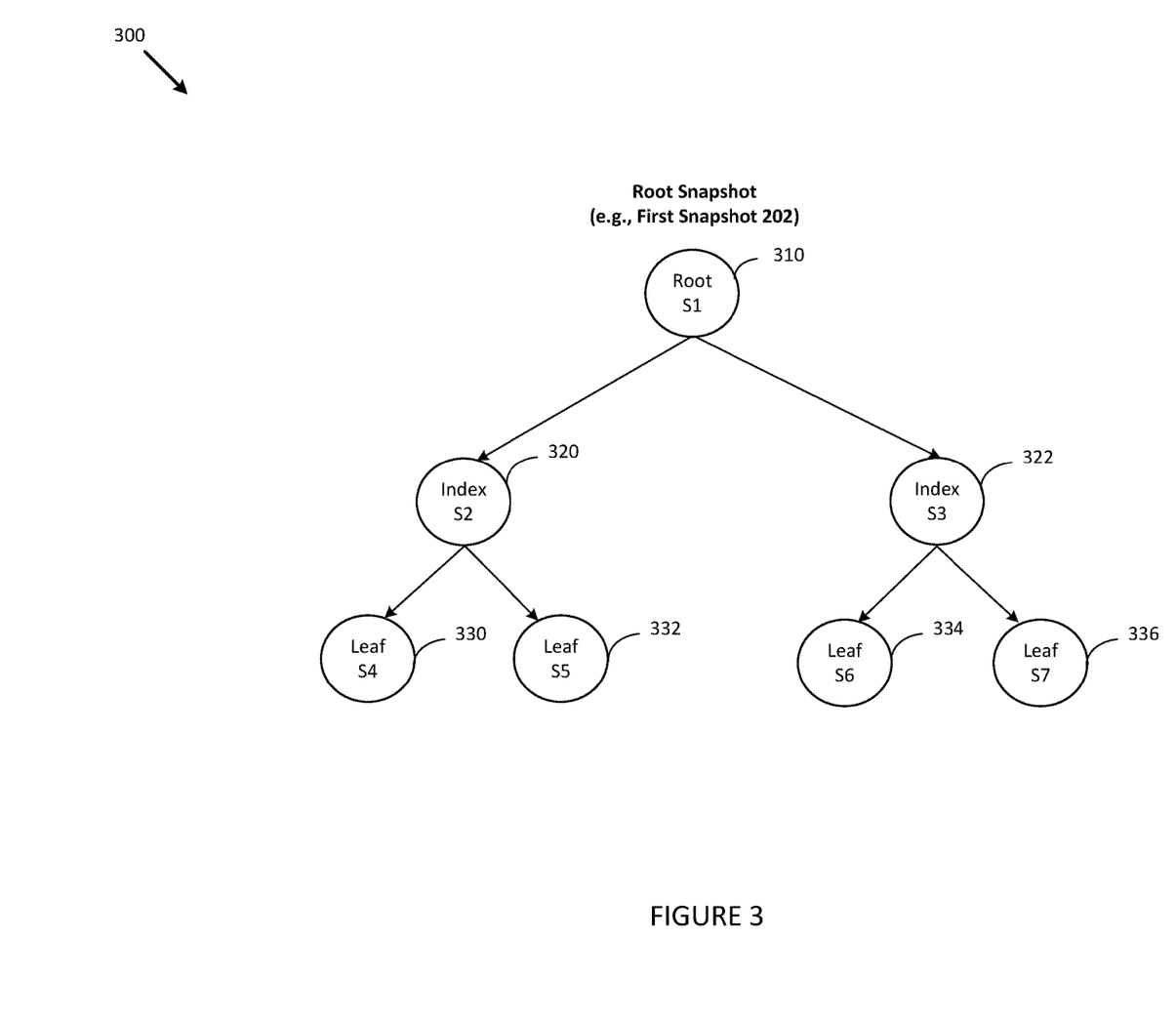
FIG. 3 is a block diagram illustrating a B+ tree data structure, according to an example embodiment of the present disclosure.

Each snapshot in the snapshot hierarchy may include its own logical map. In certain embodiments, the logical maps of the snapshots are stored as a B+ tree. FIG. 3 is a block diagram illustrating a B+ tree 300 data structure, according to an example embodiment of the present application. For illustrative purposes, B+ tree 300 may represent the logical map for the root snapshot (e.g., first snapshot 202) in snapshot hierarchy 200.

As illustrated, B+ tree 300 may include a plurality of nodes connected in a branching tree structure. The top node of a B+ tree may be referred as a root node, e.g., root node 310, which has no parent node. The middle level of B+ tree 300 may include index nodes 320 and 322 (also referred to as "index" nodes), which may have both a parent node and one or more child nodes. In the illustrated example, B+ tree 300 has three levels (e.g., level 0, level 1, and level 2), and only a single middle level (e.g., level 1), but other B+ trees may have a greater number of levels with more middle levels and thus greater heights. The bottom level of B+ tree 300 may include leaf nodes 330-336 which do not have any more children nodes. In the illustrated example, in total, B+ tree 300 has seven nodes and three levels. Root node 310 is in level two of the tree, middle (or index) nodes 320 and 322 are in level one of the tree, and leaf nodes 330-336 are in level zero of the tree.

Each node of B+ tree 300 may store at least one tuple. In a B+ tree, leaf nodes may contain data values (or real data) and middle (or index) nodes may contain only indexing keys. For example, each of leaf nodes 330-336 may store at least one tuple that includes a key mapped to real data, or mapped to a pointer to real data, for example, stored in a memory or disk. As shown in FIG. 3, these tuples may correspond to key-value pairs of <LBA, MBA> or <LBA, PBA> mappings for data blocks associated with each LBA. In some embodiments, each leaf node may also include a pointer to its sibling(s), which is not shown for simplicity of description. On the other hand, a tuple in the middle and/or root nodes of B+ tree 300 may store an indexing key and one or more pointers to its child node(s), which can be used to locate a given tuple that is stored in a child node.

Because B+ tree 300 contains sorted tuples, a read operation such as a scan or a query to B+ tree 300 may be completed by traversing the B+ tree relatively quickly to read the desired tuple, or the desired range of tuples, based on the corresponding key or starting key.

According to aspects described herein, each node of B+ tree 300 may be assigned a monotonically increasing SN. For example, a node with a higher SN may be a node which was created later in time than a node with a smaller SN. As shown in FIG. 3, root node 310 may be assigned an SN of S1 as root node 310 belongs to the root snapshot (e.g., first snapshot 202 illustrated in FIG. 2, created first in time) and was the first node created for the root snapshot. Other nodes of B+ tree 300 may similarly be assigned an SN, for example, node 320 may be assigned S2, index node 322 may be assigned S3, leaf node 330 may be assigned S4, and so forth. As described in more detail below, the SNs assigned to each node in the B+ tree snapshot may be used during snapshot deletion to verify nodes that are exclusively owned by the snapshot or that are shared with a parent snapshot.

In certain embodiments, the B+ tree logical map for each child snapshot in a snapshot hierarchy may be a COW B+ tree (also referred to as an append-only B+ tree). When a COW approach is taken and a child snapshot is created, instead of copying the entire B+ tree logical map of the parent snapshot, the child snapshot shares with the parent and, in some cases, ancestor snapshots, one or more extents by having a B+ tree index node, exclusively owned by the child, point to shared parent and/or ancestor B+ tree nodes. This COW approach for the creation of a child B+ tree logical map may be referred to as a "lazy copy approach" as the entire B+ tree logical map of the parent snapshot is not copied when creating the child B+ tree logical map.

Figure 4:
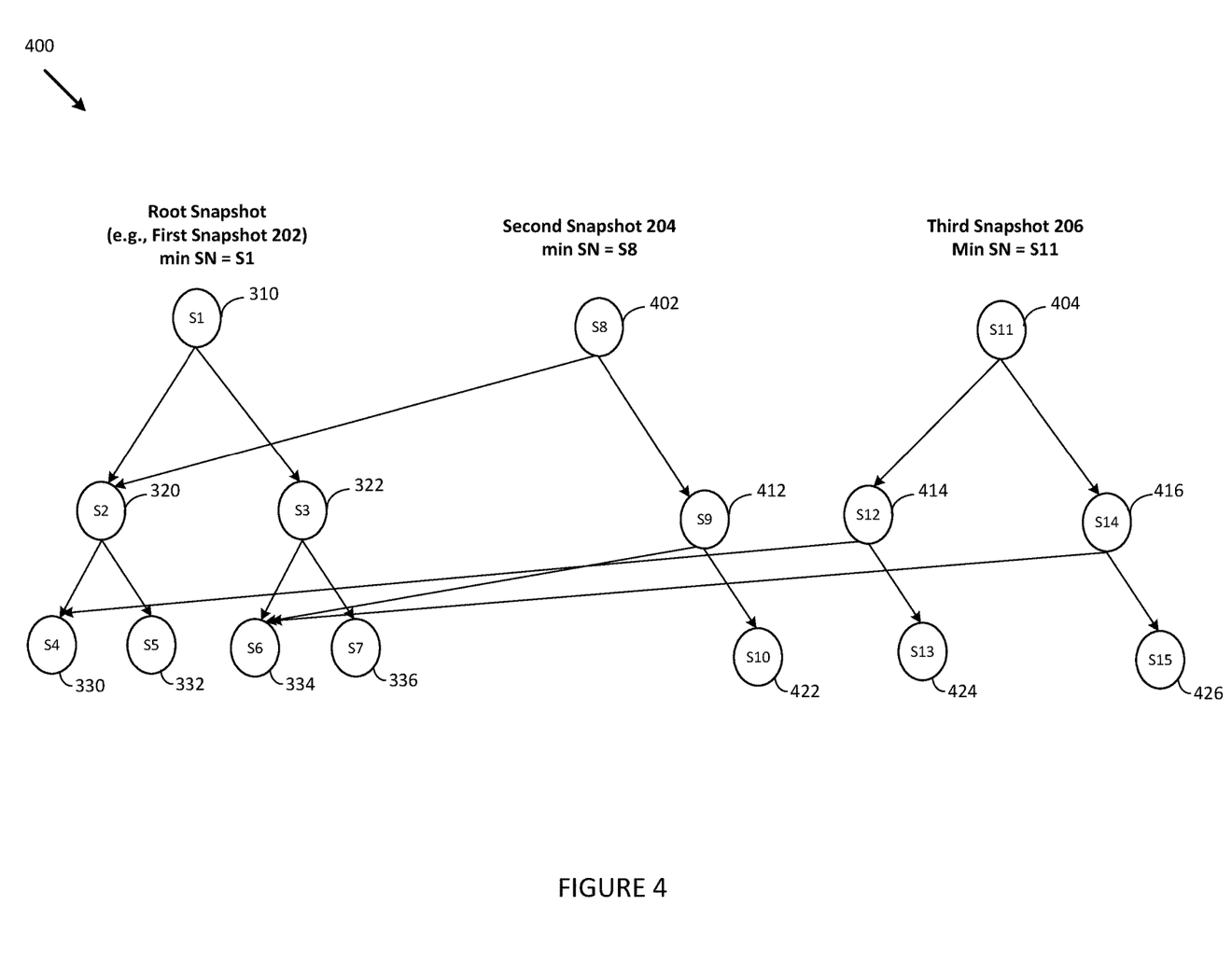
FIG. 4 is a block diagram illustrating a B+ tree data structure using a copy-on-write (COW) approach for the creation of logical map B+ trees for child snapshots in a snapshot hierarchy, according to an example embodiment of the present application

FIG. 4 is a block diagram illustrating a B+ tree data structure 400 using a COW approach for the creation of B+ tree logical maps for child snapshots in a snapshot hierarchy, according to an example embodiment of the present application. For illustrative purposes, B+ tree data structure 400 may represent the B+ tree logical maps for first snapshot 202, second snapshot 204, and third snapshot 206 in snapshot hierarchy 200. Fourth snapshot 208, fifth snapshot 210, sixth snapshot 212, and seventh snapshot 214 have been removed from the illustration of FIG. 4 for simplicity. However, B+ tree logical maps for fourth snapshot 208, fifth snapshot 210, sixth snapshot 212, and seventh snapshot 214 may exist in a similar manner as B+ tree logical maps described for first snapshot 202, second snapshot 204, and third snapshot 206 in FIG. 4.

As shown in FIG. 4, index node 320 and leaf node 334 are shared by root node 310 of a first B+ tree logical map (e.g., associated with first snapshot 202) and root node 402 of a second B+ tree logical map (e.g., associated with second snapshot 204, which is a child snapshot of first snapshot 202) generated from the first B+ tree logical map. This way, the two root nodes 310 and 402 may share the data of the tree without having to duplicate the entire data of the tree.

More specifically, when the B+ tree logical map for second snapshot 204 was created, the B+ tree logical map for first snapshot 202 was copied and snapshot data for leaf node 336 was overwritten, while leaf nodes 330, 332, and 334 were unchanged. Accordingly, root node 402 in the B+ tree logical map for second snapshot 204 has a pointer to node 320 in the B+ tree logical map for first snapshot 202 for the shared nodes 320, 330, and 332, but, instead of root node 402 having a pointer to index node 322, index node 412 was created with a pointer to shared leaf node 334 (e.g., shared between first snapshot 202 and second snapshot 204) and a pointer to new leaf node 422, containing metadata for the overwritten data block. Similar methods may have been used to create the B+ tree logical map for third snapshot 206 illustrated in FIG. 4.

As mentioned, each node of each B+ tree logical map in B+ tree data structure 400 may be assigned a monotonically increasing SN for purposes of checking the metadata consistency of snapshots in B+ tree data structure 400, and more specifically, in snapshot hierarchy 200. Further, the B+ tree logical map for each snapshot in B+ tree data structure 400 may be assigned a min SN, where the min SN is equal to a smallest SN value among all nodes owned by the snapshot. For example, in the example B+ tree data structure 400, first snapshot 202 may own nodes S1-S7; thus, the min SN assigned to the B+ tree logical map of first snapshot 202 may be equal to S1. Similarly, second snapshot 204 may own nodes S8-S10; thus, the min SN of the B+ tree logical map of second snapshot 204 may be equal to S8, and third snapshot 206 may own node S11-S15; thus, the min SN of the B+ tree logical map of third snapshot 206 may be equal to S11.

Accordingly, each node, in the B+ tree logical map of child snapshots 204 and 206 snapshot, whose SN is smaller than the min SN assigned to the B+ tree logical map of the snapshot, may be a node that is not owned by the snapshot, but instead shared with an ancestor snapshot. For example, when traversing through the B+ tree logical map of second snapshot 204, node 320 may be reached. Because node 320 is associated with an SN less than the min SN of second snapshot 204 (e.g., S2<S8), node 320 may be determined to be a node that is not owned by second snapshot 204, but instead owned by first snapshot 202 and shared with second snapshot 204. On the other hand, each node, in the B+ tree logical maps of child snapshots 204 and 206, whose SN is larger than the min SN assigned to the snapshot, may be a node that is owned by the snapshot. For example, when traversing through the B+ tree logical map of second snapshot 204, node 412 may be reached. Because node 412 is associated with an SN greater than the min SN of second snapshot 204 (e.g., S9>S8), node 412 may be determined to be a node that is owned by second snapshot 204. Such rules may be true for all nodes belonging to each of the snapshot B+ tree logical maps created for a snapshot hierarchy, such as snapshot hierarchy 200 illustrated in FIG. 2.

In an illustrative example, to delete first snapshot 202, VSAN module 108 first processes index nodes 320 and 322 before deleting root node 310. Before deleting index node 320, VSAN module 108 first processes leaf nodes 330 and 332. Before deleting index node 322, VSAN module 108 first processes leaf nodes 334 and 336. In addition, before deleting any node, VSAN module determines whether the node is exclusively owned by first snapshot 202. As shown in FIG. 4, only root node 310, index node 322, and leaf node 336 are exclusively owned by first snapshot 202. VSAN module 108 skips the nodes that are not exclusively owned by first snapshot 202. Accordingly, index node 320 (and its child leaf nodes 330 and 332) are skipped. In the top-down traversal of the logical map B+ tree, VSAN module 108 sets node path cursor 148 to <PBA of root node 310, 1>, where 1 is the pointer index in root node 310 to index node 322. VSAN module 108 skips leaf node 334 and sets node path cursor 148 to the array of <PBA of root node 310, 1> <PBA of index node 322, 1>, where 1 is the point index in index node 322 to leaf node 336. VSAN module 108 then deletes leaf node 336 and sets node path cursor to the array <PBA of root node 310, 1> <PBA of index node 322, 1> <PBA of leaf node 336, -1>, where -1 is bit value indicating node deletion. Because all its leaf nodes have been processed, VSAN module 108 can then delete index node 322 and sets node path cursor 148 to <PBA of root node 310, 1> <PBA of index node 322, -1>. Next, because all its index nodes have been processed, VSAN module 108 can then delete root node 310 and sets node path cursor 148 to <PBA of root node 310, -1>. At this point, deletion of first snapshot 202 is complete.

Figure 5:
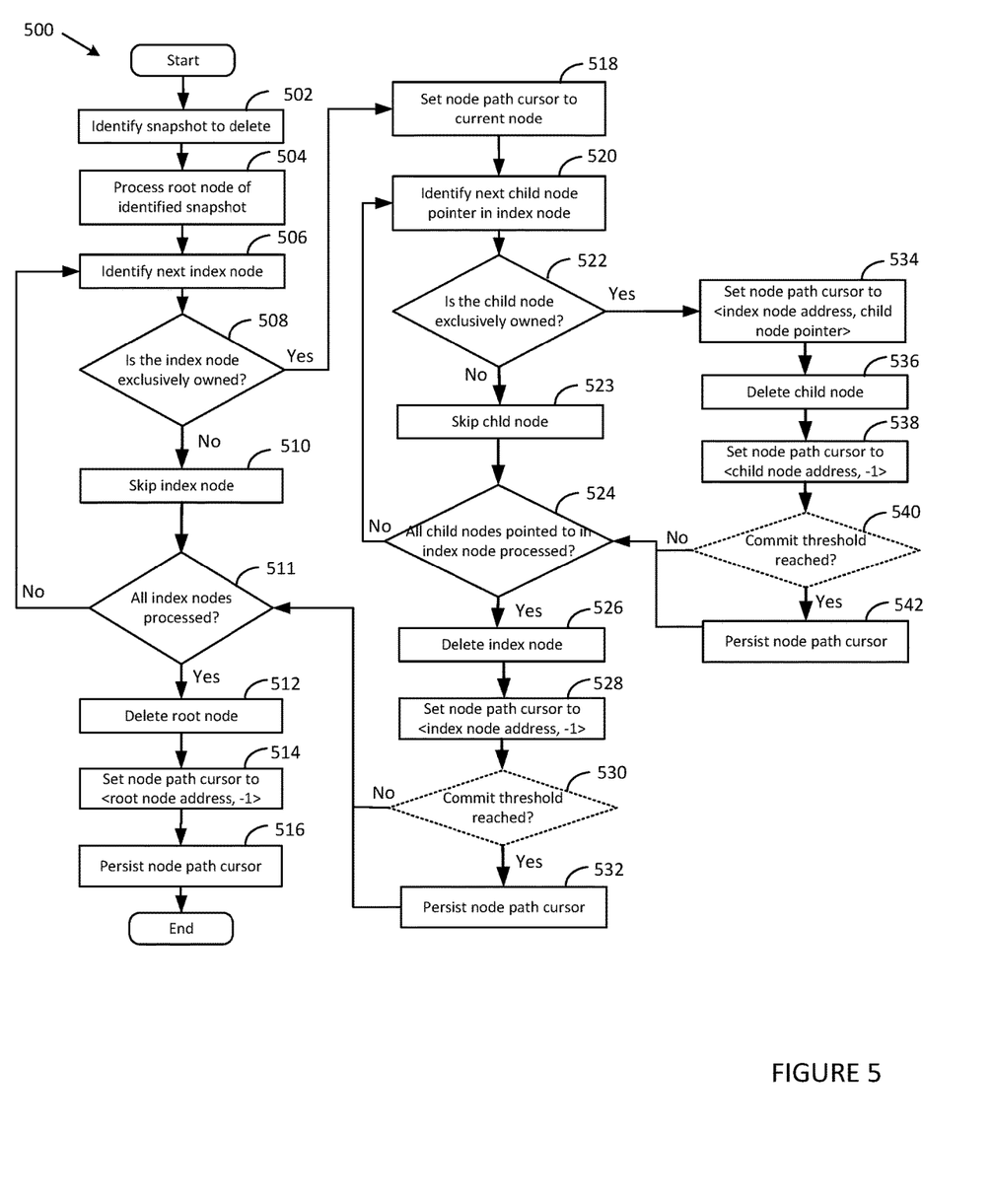
FIG. 5 is an example workflow for logical map B+ tree deletion, according to an example embodiment of the present disclosure.

FIG. 5 is an example workflow 500 for deleting logical map B+ tree nodes corresponding to a snapshot in a snapshot hierarchy, according to an example embodiment of the present disclosure. Workflow 500 may be performed by VSAN module 108, and in some cases, zDOM sub-module 132, illustrated in FIG. 1. Operations of workflow 500 may be described with respect to example snapshot hierarchy 200 of FIG. 2 and B+ tree 300 illustrated in FIG. 3.

Workflow 500 may begin, at operation 502, by VSAN module 108 identifying a snapshot to be deleted. In the illustrated example, VSAN module 108 may identify first snapshot 202 to be deleted. VSAN module 108 may identify first snapshot 202 by an instruction from an administrator of computing environment 100 to delete first snapshot 202. VSAN module 108 may identify first snapshot 202 automatically, such as by expiry of a configured lifetime for first snapshot 202 (e.g., 30 minutes).

At operation 504, VSAN module 108 processes the root node of the identified snapshot. In the illustrated example, VSAN module 108 processes root node 310 of first snapshot 202. Root node 310 points to index node 320 and index node 322. As described in more detail below, before deleting root node 310 at operation 512, VSAN module 108 first processes index node 320 and index node 322.

At operation 506, VSAN module 108 identifies a next index node to process. In the illustrated example, VSAN module 108 proceeds to the first child node, index node 320, of root node 310. Index node 320 points to leaf node 330 and leaf node 332. Before deleting index node 320, VSAN module 108 first processes leaf node 330 and leaf node 332.

At operation 508, VSAN module 108 verifies whether the identified index node is exclusively owned by the snapshot being deleted. In the illustrated example, VSAN module 108 verifies whether index node 320 is exclusively owned by first snapshot 202. In some embodiments, VSAN module 108 verifies index node 320 is not shared with a parent snapshot by verifying whether the SN of index node 320, S2, is equal to or larger than the minSN, S1, of first snapshot 202. In some embodiments, VSAN module 108 verifies index node 320 is not shared with a parent snapshot by traversing the logical map B+ tree to verify that the LBA of index node 320 is not found in a parent snapshot. In some embodiments, VSAN module 108 verifies index node 320 is not shared with a child snapshot by traversing the logical map B+ tree to verify that the LBA of index node 320 is not found in a child snapshot.

Where VSAN module 108 finds that a node is shared with another snapshot, VSAN module 108 identifies the node as not exclusively owned by the snapshot. Accordingly, where VSAN module identifies, at operation 508, the index node as not exclusively owned, then, at operation 510, VSAN module 108 skips the index node. In the illustrated example, when VSAN module 108 finds index node 320 is shared with a child snapshot, second snapshot 204, VSAN module 108 determines index node 320 is not exclusively owned by first snapshot 202 and does not delete index node 320.

At operation 511, VSAN module 108 determines whether all index nodes of the root node have been processed. In the illustrated example, VSAN module 108 determines whether all index nodes of root node 310 have been processed.

Where VSAN module 108 determines, at operation 511, that not all of the index nodes of the root node have been processed, VSAN module 108 returns to operation 506 to identify a next index node to process. In the illustrated example, after skipping index node 320 at operation 510, VSAN module 108 determines at operation 511 that not all index nodes of root node 310 have been processed and, returning to operation 506, VSAN module 108 identifies index node 322 as a next node to process.

Where VSAN module 108 finds that the node is not shared with another snapshot, VSAN module 108 identifies the node as exclusively owned by the snapshot. Accordingly, where VSAN module 108 identifies, at operation 508, the index node as exclusively owned, then, at operation 518, VSAN module 108 sets node path cursor 148 to the current node, such as to the physical address (e.g., a PBA) of the parent node and the pointer of the child index node in the parent node. In the illustrated example, where VSAN module 108 determines index node 322 is exclusively owned by first snapshot 202, VSAN module 108 sets node path cursor 148 to <PBA of root node 310, 1>, where 1 is the pointer in root node 310 to index node 322.

As discussed above, before deleting an exclusively owned index node, VSAN module 108 first processes the child nodes of the index node. In some embodiments, the child node of the index node is another index node. The bottom level of the logical map B+ tree are leaf nodes. Thus, where the child nodes of the index node are index nodes, the index node may not be deleted until leaf nodes associated with all of the child index nodes of the index have been processed. Accordingly, at operation 520, VSAN module 108 identifies a next child node pointer in the index node. In the illustrated example, index node 322 includes pointers to leaf node 334 and leaf node 336. At operation 520, VSAN module 108 identifies leaf node 334 as a next leaf node to process.

At operation 522, VSAN module 108 verifies whether the identified child node is exclusively owned by the snapshot being deleted. VSAN module 108 may verify the child node is not shared with a parent snapshot by verifying whether the SN of the child node is equal to or larger than the minSN of the snapshot. In some embodiments, VSAN module 108 verifies the child node is not shared with a parent snapshot by traversing the logical map B+ tree to verify that the LBA of child node is not found in a parent snapshot. VSAN module 108 may verify the child node is not shared with a child snapshot by traversing the logical map B+ tree to verify that the LBA of child node is not found in a child snapshot.

Where, at operation 522, VSAN module 108 determines the child node is shared with another snapshot, then at operation 523, VSAN module 108 skips the child node. In the illustrated example, VSAN module 108 determines leaf node 334 is shared with second snapshot 204 and/or third snapshot 206. In some embodiments, VSAN module 108 traverses the logical map B+ tree and finds the LBA associated with leaf node 336 in second snapshot 204 and/or third snapshot 206. Thus, VSAN module 108 determines leaf node 334 is shared and skips (i.e., does not delete) leaf node 334.

At operation 524, VSAN module 108 determines whether all child nodes pointed to in the index node have been processed. In the illustrated example, VSAN module 108 determines whether all leaf nodes of index node 322 have been processed.

Where VSAN module 108 determines, at operation 524, that not all of the child nodes of the index node have been processed, VSAN module 108 returns to operation 520 to identify a next child node to process. In the illustrated example, after skipping leaf node 334 at operation 523, VSAN module 108 determines, at operation 524, that not all leaf nodes of index node 322 have been processed. VSAN module 108 returns to operation 520 and identifies leaf node 336 as a next node to process.

Where VSAN module 108 determines, at operation 522, that the child node is exclusively owned, then at operation 534, VSAN module 108 sets node path cursor 148 to the physical address of the index node and to the pointer in the index node to the child node. In the illustrated example, VSAN module 108 determines leaf node 336 is exclusively owned by first snapshot 202 and VSAN module 108 sets node path cursor 148 to <PBA of index node 322, 1>, where 1 is the index value in index node 322 pointing to leaf node 336.

Where, VSAN module 108 determines, at operation 522, that the child node is exclusively owned and after VSAN module 108 sets node path cursor 148, at operation 534, then VSAN module 108 deletes the child node at operation 536. In the illustrated example, VSAN module 108 deletes leaf node 336.

After deleting the child node, at operation 536, VSAN module 108 sets node path cursor 148 to the physical address of the child node and a bit value indicating the deletion at operation 538. In the illustrated example, VSAN module 108 sets node path cursor 148 to <PBA of leaf node 336, −1>. In some embodiments, VSAN module 108 sets node path cursor 148 to the array <PBA of root node 310, 1> <PBA of index node 322> <PBA of leaf node 336, −1>. In some embodiments, VSAN module 108 sets node path cursor 148 to the array <PBA of root node 310> <pointer to index node 322> <pointer to leaf node 336> <−1>.

In some embodiments, node path cursor 148 is persisted when a transaction is committed. Committing a transaction may refer to actually executing a change to the data in persistent storage. For snapshot deletion, committing a transaction may refer to deleting a page, associated with a node, from storage. In some embodiments, a transaction may not be committed until a threshold number of nodes (e.g., a commit threshold) are to be deleted in a transaction. Node path cursor 148 may be kept in memory until the commit threshold is reached and a transaction is committed. In this way, the I/O cost to update the node path cursor can be amortized over multiple transactions.

Accordingly, after deleting a child node, at operation 536, and setting node path cursor 148, at operation 538, VSAN module 108 may determine, at operation 540 whether a commit threshold has been reached before persisting node path cursor 148.

Where VSAN module 108 determines, at operation 540, that the commit threshold has been reached, VSAN module 108 persists node path cursor 148 at operation 542. In the illustrated example, the commit threshold is one (e.g., one page). Accordingly, after leaf node 336 is deleted, at operation 536, and node path cursor 148 is set, at operation 538, then VSAN module 108 determines, at operation 540, that the commit threshold of 1 has been reached and VSAN module 108 persists node path cursor 148 at operation 542.

Where VSAN module 108 determines, at operation 540, that the commit threshold has not been reached or where VSAN module 108 persists node path cursor 148, at operation 542, VSAN module 108 returns to operation 524 and determines whether all leaf nodes pointed to in the index node have been processed.

Where VSAN module 108 determines all child nodes pointed to in the index node have been processed, VSAN module 108 deletes the index node at operation 526. In the illustrated example, VSAN module 108 determines all leaf nodes of index node 322 have been processed (e.g., leaf node 334 was skipped and leaf node 336 was deleted) and proceeds to delete index node 322 at operation 526.

After deleting the index node, at operation 526, VSAN module 108 sets node path cursor 148 to the physical address of the index node and a bit value indicating the deletion at 528. In the illustrated example, VSAN module 108 sets node path cursor 148 to <PBA of index node 322, −1>. In some embodiments, VSAN module 108 sets node path cursor 148 to the array <PBA of root node 310, 1> <PBA of index node 322, −1>. In some embodiments, VSAN module 108 sets node path cursor 148 to the array <PBA of root node 310> <pointer to index node 322> <−1>.

At operation 530, VSAN module 108 may determine whether the commit threshold has been reached before persisting node path cursor 148. Where VSAN module 108 determines, at operation 530, that the commit threshold has been reached, VSAN module 108 persists node path cursor 148 at operation 532. In the illustrated example, after index node 322 is deleted, at operation 526, and node path cursor 148 is set, at operation 528, VSAN module 108 determines, at operation 530, the commit threshold of 1 has been reached and persists node path cursor 148 at operation 532.

Where VSAN module 108 determines, at operation 530, that the commit threshold has not been reached or after VSAN module 108 persists node path cursor 148, at operation 532, VSAN module 108 returns to operation 511 and determines whether all index nodes pointed to in the root node have been processed.

Where, at operation 511, VSAN module 108 determines that all of the index nodes pointed to in the root node have been processed, VSAN module 108 deletes the root node at operation 512. In the illustrated example, after VSAN module 108 deletes index node 322, VSAN module 108 determines that all index nodes of root node 310 have been processed and deletes root node 310.

After deleting the root node, at operation 512, VSAN module 108 sets node path cursor 148, at operation 514, to the physical address of the root node and a bit value indicating the deletion. In the illustrated example, VSAN module 108 sets node path cursor 148 to <PBA of root node 310, −1>.

At operation 516, VSAN module 108 persists node path cursor 148 to storage.

As discussed herein, a crash or other failure may occur during snapshot deletion. When such a crash or failure occurs, the logical map B+ tree deletion may be resumed using the persisted node path cursor 148. VSAN 108 may resume the logical map B+ tree deletion from the node indicated in the node path cursor 148.

Figure 6:
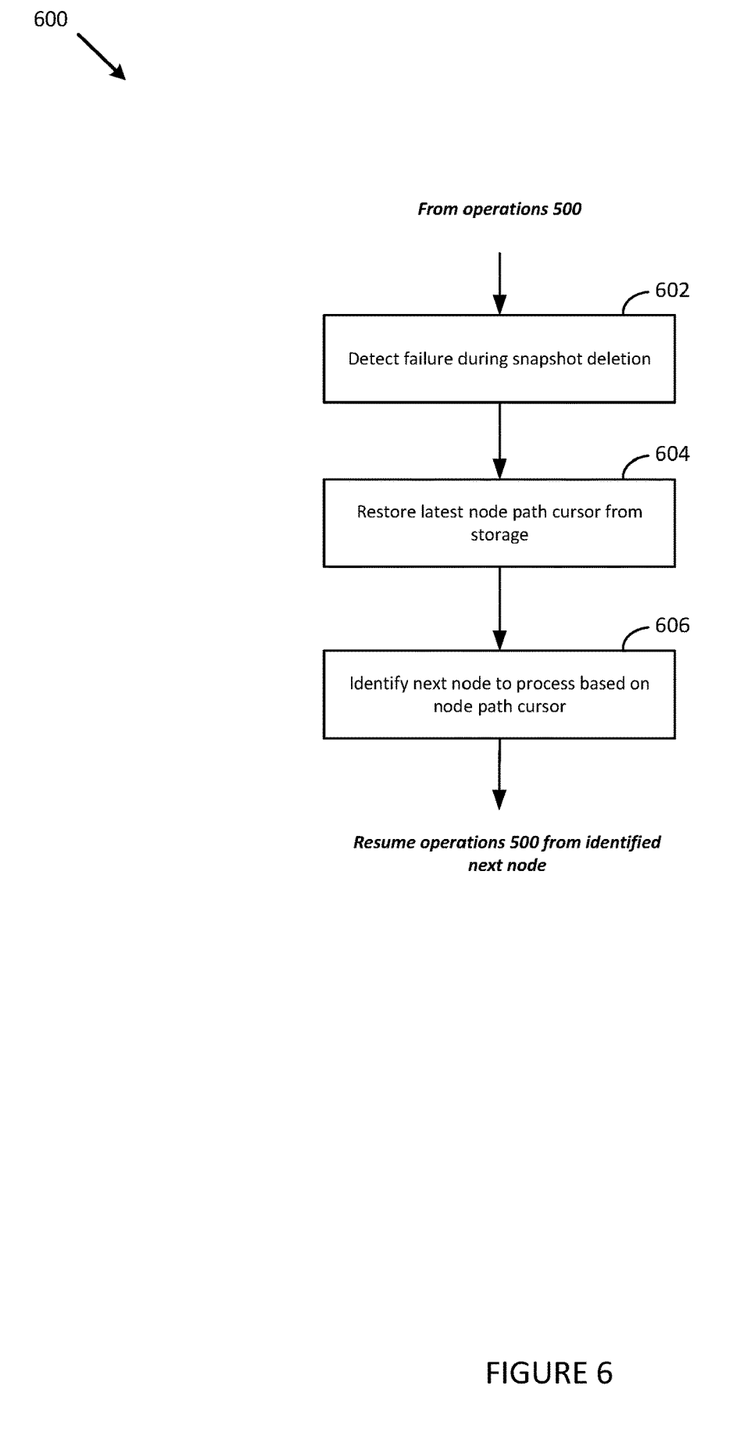
FIG. 6 is an example workflow for resuming logical map B+ tree deletion, according to an example embodiment of the present disclosure.

FIG. 6 is an example workflow 600 for resuming deletion of logical map B+ tree nodes corresponding to a snapshot in a snapshot hierarchy, according to an example embodiment of the present disclosure. Workflow 600 may be performed by VSAN module 108, and in some cases, zDOM sub-module 132, illustrated in FIG. 1. Operations of workflow 600 may be described with respect to example snapshot hierarchy 200 of FIG. 2 and B+ tree 300 illustrated in FIG. 3. Workflow 600 may be performed during workflow 500 when a crash or failure occurs during deletion of logical map B+ tree nodes for a snapshot.

Workflow 600 may begin, at operation 602, by detecting a failure during snapshot deletion. In the illustrated example, a crash or failure may occur during deletion of first snapshot 202. For example, a crash or failure may occur after VSAN module 108 persists the node path cursor <PBA of leaf node 336, −1> at operation 542 after deleting the leaf node 3336.

At operation 604, VSAN module 108 restores a latest persisted node path cursor 148 from storage. In the illustrated example, VSAN module 108 may restore the node path cursor <PBA of leaf node 336, −1> from VSAN 116 to memory 114.

At operation 606, VSAN module 108 identifies a next node to process in the logical map B+ tree based on the node path cursor 148. In the illustrated example, VSAN module 108 assumes that nodes before leaf node 336 have been processed and resumes the logical map B+ tree deletion, at operation 524, by determining all leaf nodes of index node 322 have been processed, at operation 524, and deleting index node 322 at operation 526.

Techniques described herein for storing a node path cursor with information of a last processed logical map B+ tree provide a low overhead solution for resuming logical map B+ tree node deletion and avoiding dangling pointers.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for deletion of nodes maintained in an ordered data structure for a first snapshot, the method comprising:
   processing the nodes maintained in the ordered data structure according to a defined order, wherein processing the nodes includes:
      identifying a first node of a plurality of nodes maintained in the ordered data structure for the first snapshot;
      determining the first node is exclusively owned by the first snapshot; and
      deleting the first node based on the determination;
   setting a node path cursor with a pointer to the first node and an indication of the deletion of the first node;
   storing the node path cursor in a persistent storage; and
   during processing of the nodes:
      detecting a failure;
      after the failure, checking the pointer of the node path cursor; and resuming processing of the nodes starting from the first node indicated by the pointer.

2. The method of claim 1, wherein processing the nodes according to the defined order comprises, for each of the nodes, processing all child nodes of the node before deleting the node.

3. The method of claim 1, wherein processing the nodes further includes:
identifying a second node of the plurality of nodes maintained in the order data structure for the first snapshot;
determining the node is shared with a second snapshot; and
skipping the second node for deletion.

4. The method of claim 1, wherein the node path cursor further comprises a physical block address (PBA) of the first node.

5. The method of claim 1, wherein the node path cursor further comprises a physical block address (PBA) of a root node in the order data structure for the first snapshot and a pointer at each level of the ordered data structure to the first node.

6. The method of claim 1, wherein storing the node path cursor in the persistent storage comprises:
storing the node path cursor in memory;
determining a threshold number of nodes have been deleted in memory;
deleting the number of nodes from the persistent storage as a transaction; and
storing the node path cursor in the persistent storage as a part of the transaction.

7. The method of claim 1, wherein determining the first node is exclusively owned by the first snapshot comprises determining a logical block address (LBA) associated with the first node is not found in the ordered data structure for any other snapshot.

8. A system for deletion of nodes maintained in an ordered data structure for a first snapshot, comprising:
one or more processors; and
at least one memory, the one or more processors and the at least one memory configured to:
process the nodes maintained in the ordered data structure according to a defined order, wherein processing the nodes includes:
identify a first node of a plurality of nodes maintained in the ordered data structure for the first snapshot;
determine the first node is exclusively owned by the first snapshot; and
delete the first node based on the determination;
set a node path cursor with a pointer to the first node and an indication of the deletion of the first node;
store the node path cursor in a persistent storage; and
during processing of the nodes:
detect a failure;
after the failure, check the pointer of the node path cursor; and
resume processing of the nodes starting from the first node indicated by the pointer.

9. The system of claim 8, wherein the one or more processors and the at least one memory are configured to process the nodes according to the defined order by, for each of the nodes, processing all child nodes of the node before deleting the node.

10. The system of claim 8, wherein the one or more processors and the at least one memory are configured to process the nodes by:
identifying a second node of the plurality of nodes maintained in the order data structure for the first snapshot;
determining the node is shared with a second snapshot; and
skipping the second node for deletion.

11. The system of claim 8, wherein the node path cursor further comprises a physical block address (PBA) of the first node.

12. The system of claim 8, wherein the node path cursor further comprises a physical block address (PBA) of a root node in the order data structure for the first snapshot and a pointer at each level of the ordered data structure to the first node.

13. The system of claim 8, wherein the one or more processors and the at least one memory are configured to store the node path cursor in the persistent storage by:
storing the node path cursor in memory;
determining a threshold number of nodes have been deleted in memory;
deleting the number of nodes from the persistent storage as a transaction; and
storing the node path cursor in the persistent storage as a part of the transaction.

14. The system of claim 8, wherein the one or more processors and the at least one memory are configured to determine the first node is exclusively owned by the first snapshot by determining a logical block address (LBA) associated with the first node is not found in the ordered data structure for any other snapshot.

15. A non-transitory computer-readable medium comprising instructions that, when executed by one or more processors of a computing system, cause the computing system to perform operations for deletion of nodes maintained in an ordered data structure for a first snapshot, the operations comprising:
processing the nodes maintained in the ordered data structure according to a defined order, wherein processing the nodes includes:
identifying a first node of a plurality of nodes maintained in the ordered data structure for the first snapshot;
determining the first node is exclusively owned by the first snapshot; and
deleting the first node based on the determination;
setting a node path cursor with a pointer to the first node and an indication of the deletion of the first node;
storing the node path cursor in a persistent storage; and
during processing of the nodes:
detecting a failure;
after the failure, checking the pointer of the node path cursor; and
resuming processing of the nodes starting from the first node indicated by the pointer.

16. The non-transitory computer-readable medium of claim 15, wherein processing the nodes according to the defined order comprises, for each of the nodes, processing all child nodes of the node before deleting the node.

17. The non-transitory computer-readable medium of claim 15, wherein processing the nodes further includes:
identifying a second node of the plurality of nodes maintained in the order data structure for the first snapshot;
determining the node is shared with a second snapshot; and
skipping the second node for deletion.

18. The non-transitory computer-readable medium of claim 15, wherein the node path cursor further comprises a physical block address (PBA) of the first node.

19. The non-transitory computer-readable medium of claim 15, wherein the node path cursor further comprises a physical block address (PBA) of a root node in the order data structure for the first snapshot and a pointer at each level of the ordered data structure to the first node.

20. The non-transitory computer-readable medium of claim 15, wherein storing the node path cursor in the persistent storage comprises:
  storing the node path cursor in memory;
  determining a threshold number of nodes have been deleted in memory;
  deleting the number of nodes from the persistent storage as a transaction; and
  storing the node path cursor in the persistent storage as a part of the transaction.

* * * * *